United States Patent Office 2,859,163
Patented Nov. 4, 1958

2,859,163

CADMIUM-RARE EARTH BORATE GLASS AS REACTOR CONTROL MATERIAL

George L. Ploetz, Scotia, and William E. Ray, Schenectady, N. Y., assignors to the United States of America as represented by the United States Atomic Energy Commission No Drawing. Application December 30, 1957
Serial No. 706,221

1 Claim. (Cl. 204—193.2)

This invention relates in general to a material adapted for use in control rods in a neutronic reactor.

It is an object of this invention to provide a material suitable for fabrication into neutronic reactor control rods, which is capable of absorbing neutrons over a wide range of energies, and more specifically, is capable of absorbing thermal neutrons and neutrons of intermediate energy.

Another object is to provide a material which has improved resistance to deformation induced by radiation, and which also possesses good corrosion resistance.

A further object of this invention is to provide a material suitable for use in a neutronic reactor control rod, which has neutron absorbing properties equal or superior to those of the materials currently used as control rods.

The invention relates specifically to the use of small vitreous or glassy particles, dispersed in a matrix of metal, as a control rod material. The vitreous particles consist of cadmium-borate glass with inclusions of rare earth oxides, or the oxides of other elements which are capable of functioning as neutron absorbing reactor poisons. The vitreous particles are mixed with metal powder, and powder metallurgy techniques are then used to produce control rod shapes from this neutron absorbing glass-metal powder mixture. These compacted vitreous particle-powdered metal shapes are then given a cladding of a corrosion resistant metal by a co-extrusion technique as will be shown hereinafter.

The vitreous or glassy particles contemplated by this invention are in general cadmium borates and cadmium-rare earths borates. The rare earth oxides employed include those of gadolinium, samarium, europium and dysprosium. Other refractory oxides such as $SiO_2$, $TiO_2$, $ZrO_2$, $Al_2O_3$, or $CaO$ may also be added without departing from the invention. One preferred composition which was found to have good neutron absorbing properties is as follows: CdO, 25%; $Gd_2O_3$, 25%; $B_2O_3$, 30%; CaO, 20%. This material has a density of about 4.0 gm./cm.$^3$ and may be prepared by melting the component oxides in a suitable crucible in a resistance furnace at a temperature of approximately 1200° C. This glass is then cooled, solidified, and crushed into particles suitable in size for inclusion in the glass metal compacts. The following table shows some typical formulations within the scope of this invention. Obviously, the physical and nuclear properties of these compositions vary, and compositions suitable for various applications may be selected from those listed or from similar ones.

*Table I*

[Neutron absorbing glass compositions, weight percent.]

| | CdO | $HfO_2$ | $Sm_2O_3$ | $Gd_2O_3$ | $Eu_2O_3$ | $TiO_2$ | $B_2O_3$ | $ZrO_2$ | $Al_2O_3$ | CaO | MgO |
|---|---|---|---|---|---|---|---|---|---|---|---|
| (A) | 25 | | | 25 | | | 30 | | | 20 | |
| (B) | 25 | | | 25 | | | 30 | 20 | | | |
| (C) | 25 | | | 25 | | 10 | 30 | | | 10 | |
| (D) | 58.0 | | | | | 4.1 | 28.8 | 6.3 | 5.3 | 1.5 | 1.0 |
| (E) | 60 | 5 | | | | | 35 | | | | |
| (F) | 78 | | | | | | 22 | | | | |
| (G) | 58.6 | | | | | | 35.2 | 6.2 | | | |
| (H) | 60 | | | | | | 35 | | 5 | | |
| (I) | 54.5 | | | | | 8.5 | 37 | | | | |
| (J) | 35 | | | 32 | | | 33 | | | | |
| (K) | 35 | | | | 32 | | 33 | | | | |
| (L) | 35 | | 32 | | | | 33 | | | | |

The use of cadmium borate glass or of cadmium-rare earth borate glass as a neutron absorbing material provides a relatively cheap material with excellent neutron absorbing properties, since the use of two or more neutron absorbers in the same unit cell lattice structure appears to have certain advantages over the use of a single reactor poison. Such mixtures provide absorption over a wider range of the neutron energy spectrum. The boron extends the neutron absorption well into the intermediate neutron energy range while the gadolinium and cadmium protect against the burn up of the boron by low energy neutrons below approximately 0.2 ev. The neutron absorbing powers of the glass may be even further enhanced by the addition of europium oxide or the oxide of some other element with a high neutron capture cross section. Another advantage of these glassy neutron absorbers is that the vitreous structure is known to contain more vacant lattice sites than a crystalline lattice. These vacancies could conceivably be useful in accommodating the helium and lithium atoms that are formed as a result of the decay of $B^{10}$ atoms, and thereby reduce radiation damage to the structure.

The crushed glass powders are most advantageously dispersed in the metal matrix by powder metallurgy techniques. For example, there were mixed together 85 parts by weight of titanium powder (—50 mesh particles size) and 15 parts by weight of the crushed glass composition (A) as shown in Table I (—40, 140 mesh particle size). The mixed powders were charged into a rectangular die and compacted by cold-pressing at 46 t. s. i. The product of this operation was a titanium plate with neutron absorbing glass dispersed therein, measuring approximately 1.5 in. x 5 in. x 0.187 in. As can be readily understood, variously shaped compacts may be produced by this method or by any other suitable powder metallurgy technique.

Another plate was formed using 15 weight percent of the neutron absorbing glass composition, crushed to −325 mesh particle size, instead of the larger particle size used in the example above, dispersed in a titanium metal matrix. After a fabrication procedure exactly like the one outlined above, the product was a plate similar to the described one and having the same dimensions.

The use of 15 weight percent of the neutron absorbing glass was selected arbitrarily as a basis for tests to definitely establish fabrication feasibility for the glass-metal powder compacts. The actual amount of neutron absorbing glass which would be incorporated into the metal matrix for an operationally designed control rod would, of course, depend on the neutron absorbing efficiency desired, and could be varied within limits in order to provide the desired neutron absorbing capability. For example, in order that a control rod fabricated of the material of this invention should possess neutron absorbing qualities equivalent to those of a rod composed of 1.5 weight percent of $B^{10}$ in a zirconium matrix, the rod should contain 23 weight percent of the glass with the composition noted above (Composition A), and 77 weight percent of the titanium matrix, assuming that the boron contained in the glass is $B^{10}$. It should be noted here, that dispersion compacts of this type have been fabricated by using a hot co-extrusion technique, containing up to 40 volume percent of vitreous particle inclusions.

Before being used as control rod elements in a neutronic reactor the metal-glass compacts of this invention are preferably covered or canned with a sheath of inert corrosion resistant metal.

Furthermore, it is advantageous to utilize the same metal both as matrix for the neutron absorbing glass inclusions and as cladding for the metal-glass compact. The advantage lies in the fact that during the cladding process an exceptionally good homogeneous bond is formed between the cladding and the outer surface of the metal glass compact. It may be pointed out here that although titanium is favored as the matrix and cladding metal, other metals may be used. In fact, it is possible to fabricate control rods of this type using matrices of any metal or alloy composition which can be prepared in powder form. For example titanium, pure iron, stainless steel, copper, silver, zirconium and aluminum have been used in preparing these dispersions. With regard to cladding materials, the only limitation which we have encountered is that it is preferred that the cladding alloy match the core matrix material in hot deformation characteristics. Thus, it is convenient to clad glass dispersions with the same alloy used as a matrix material. The cladding may be prepared using either wrought or powder metallurgy starting materials. It is worthy of emphasis that the above-mentioned matching is a matter of convenience rather than a matter of necessity. For example, we have clad silver dispersions with titanium.

A preferred method for effecting the cladding of these glass-metal compacts is by a hot co-extrusion technique, which consists in assembling the powder compacts together with sheets of the cladding metal, surrounding the compact and cladding metal with a jacket of some other metal such as mild steel, and hot extruding the entire assembly through a circular die. After extrusion, the jacket material is removed in any convenient way, preferably by chemical dissolution in a solvent which does not attack the clad control rod. It is possible by the use of this coextrusion technique to extrude rods with complicated cross sections such as cross or Y-shaped rods.

These rods are suitable for use in controlling the neutron flux in reactors such as that disclosed in the patent to Fermi, 2,708,656, or for use with the reactor designated as the Experimental Boiling Water Reactor, which reactor is fully disclosed in Argonne National Laboratories publication ANL 5607 of May 1957, printed and distributed by the Government Printing Office.

While this invention has been described with reference to certain embodiments thereof, applicants do not intend that the invention shall be limited in any way except by the scope of the appended claim. We claim as our invention:

A neutronic reactor control rod fabricated from a material consisting of particles of cadmium-rare earth-borate glass, wherein the rare earth metal oxide is selected from the group consisting of $HfO_2$, $Sm_2O_3$, $Gd_2O_3$, and $Eu_2O_3$; dispersed in a metal matrix which metal is selected from the group consisting of titanium, stainless steel, zirconium, and aluminum; which control rod is sheathed with a covering of metal selected from the group consisting of titanium, stainless steel, zirconium and aluminum.

References Cited in the file of this patent

UNITED STATES PATENTS

| | | |
|---|---|---|
| 2,274,830 | Gould et al. | Mar. 3, 1942 |
| 2,415,036 | Quinn | Jan. 28, 1947 |
| 2,430,540 | Sun et al. | Nov. 11, 1947 |
| 2,431,660 | Gaudenzi | Nov. 25, 1947 |
| 2,559,572 | Stalego | July 3, 1951 |
| 2,582,081 | Sun et al. | Jan. 8, 1952 |
| 2,727,996 | Rockwell et al. | Dec. 20, 1955 |
| 2,747,105 | Fitzgerald et al. | May 22, 1956 |